United States Patent
Roy et al.

(10) Patent No.: US 10,339,169 B2
(45) Date of Patent: Jul. 2, 2019

(54) METHOD AND SYSTEM FOR RESPONSE EVALUATION OF USERS FROM ELECTRONIC DOCUMENTS

(71) Applicant: Conduent Business Services, LLC, Dallas, TX (US)

(72) Inventors: Shourya Roy, Bangalore (IN); Deepali Semwal, Uttarakhand (IN); Raghuram Krishnapuram, Bangalore (IN)

(73) Assignee: Conduent Business Services, LLC, Florham Park, NJ (US)

( * ) Notice: Subject to any disclaimer, the term of this patent is extended or adjusted under 35 U.S.C. 154(b) by 386 days.

(21) Appl. No.: 15/259,520

(22) Filed: Sep. 8, 2016

(65) Prior Publication Data
US 2018/0068016 A1   Mar. 8, 2018

(51) Int. Cl.
*G06F 16/335* (2019.01)
*G06F 16/34* (2019.01)
*G09B 7/02* (2006.01)
*G06F 16/332* (2019.01)

(52) U.S. Cl.
CPC ........ *G06F 16/335* (2019.01); *G06F 16/3329* (2019.01); *G06F 16/34* (2019.01); *G09B 7/02* (2013.01)

(58) Field of Classification Search
CPC combination set(s) only.
See application file for complete search history.

(56) References Cited

U.S. PATENT DOCUMENTS

| | | | |
|---|---|---|---|
| 9,697,099 B2* | 7/2017 | Dubbels | G06F 16/313 |
| 2011/0270883 A1 | 11/2011 | Bukai et al. | |
| 2014/0298199 A1* | 10/2014 | Johnson, Jr. | G06Q 10/101 715/753 |
| 2015/0044659 A1 | 2/2015 | Basu et al. | |
| 2017/0351677 A1* | 12/2017 | Chaubal | G06F 16/345 |

OTHER PUBLICATIONS

Jana Z Sukkarieh, Stephen G Pulman, and Nicholas Raikes. Automarking: using computational linguistics to score short, free text responses. International Association of Educational Assessment, Philadephia, 2004.

(Continued)

*Primary Examiner* — Shyue Jiunn Hwa
(74) *Attorney, Agent, or Firm* — Jones Robb, PLLC

(57) ABSTRACT

A method and a system for response evaluation of users from electronic documents are disclosed. In an embodiment, one or more questions and a first response pertaining to each of the one or more questions are extracted from one or more first electronic documents. Further, a second response pertaining to each of the one or more extracted questions and metadata are extracted from one or more second electronic documents. For the second response pertaining to each of the one or more extracted questions, a score is determined based on one or more similarity measures that correspond to a category of each of the one or more extracted questions. Thereafter, the response evaluation is rendered on a user interface displayed on a display screen. The response evaluation comprises at least the determined score for the second response pertaining to each of the one or more extracted questions.

21 Claims, 5 Drawing Sheets

(56) References Cited

OTHER PUBLICATIONS

Philip G Butcher and Sally E Jordan. A comparison of human and computer marking of short free-text student responses. Computers & Education, 55(2):489{499, 2010.

Rodney D Nielsen, Jason Buckingham, Gary Knoll, Ben Marsh, and Leysia Palen. A taxonomy of questions for question generation. In Proc. of the Workshop on the Question Generation Shared Task and Evaluation Challenge, 2008.

Semire Dikli. An overview of automated scoring of essays. Journal of Technology, Learning, and Assessment (JTLA), 5(1):36, Aug. 2006.

Salvatore Valenti, Francesca Neri, and Alessandro Cucchiarelli. An overview of current research on automated essay grading. JITE, 2:319-330, 2003.

Rodney D. Nielsen, Wayne Ward, James H. Martin, and Martha Palmer. Annotating students' understanding of science concepts. In LREC. European Language Resources Association, 2008.

Hao-Chuan Wang, Chun-Yen Chang, and Tsai-Yen Li. Assessing creative problem-solving with automated text grading. Computers & Education, 51(4):1450{1466, 2008.

Nitin Madnani, Jill Burstein, John Sabatini, and Tenaha O/\a€™Reilly. Automated scoring of a summary writing task designed to measure reading comprehension. NAACL/HLT 2013, p. 163, 2013.

Lisa Mintz, Sidney D/\a€™Mello, Dan Stefanescu, Arthur C Graesser, and Shi Feng. Automatic assessment of student reading comprehension from short summaries. In Educational Data Mining Conference, 2014.

Dharmendra Kanejiya, Arun Kumar, and Surendra Prasad. Automatic evaluation of students' answers using syntactically enhanced LSA. In Proc. of the HLT-NAACL workshop on Building educational applications using natural language processing—vol. 2, pp. 53{60, Stroudsburg, PA, USA, 2003. Association for Computational Linguistics.

Avirup Sil, Diane Jass Ketelhut, Angela Shelton, and Alexander Yates. Automatic grading of scientific inquiry. In Proc. of the Seventh Workshop on Building Educational Applications Using NLP, pp. 22{32. Association for Computational Linguistics, 2012.

Stephen G. Pulman and Jana Z. Sukkarieh. Automatic short answer marking. In Proc. of the Second Workshop on Building Educational Applications Using NLP, EdAppsNLP 05, pp. 9-16, Stroudsburg, PA, USA, 2005. Association for Computational Linguistics.

David Callear, Jenny Jerrams-Smith, Victor Soh, Dr. Jenny Jerramssmith, and Hants Po Ae. CAA of short non-mcq answers. In Proc. of the 5th International CAA conference, 2001.

Stephen P. Klein et al. Characteristics of hand and machine-assigned scores to college student's answers to open-ended tasks. In Probability and statistics: Essays in honor of David A. Freedman, pp. 76{89. Institute of Mathematical Statistics, 2008.

Pallavi Manohar and Shourya Roy. Crowd, the teaching assistant: Educational assessment crowdsourcing. In HCOMP. AAAI, 2013.

Myroslava Dzikovska, Peter Bell, Amy Isard, and Johanna D. Moore. Evaluating language understanding accuracy with respect to objective outcomes in a dialogue system. In EACL, pp. 471-481. The Association for Computer Linguistics, 2012.

Jana Z Sukkarieh and Stephen G Pulman. Information extraction and machine learning: Auto-marking short free text responses to science questions. In Proc. of the 2005 conference on artificial intelligence in education: Supporting learning through intelligent and socially informed technology, pp. 629{637. IOS Press, 2005.

Jana Zuheir Sukkarieh and John Blackmore. c-rater: Automatic content scoring for short constructed responses. In FLAIRS Conference. AAAI Press, 2009.

Michael Mohler, Razvan C. Bunescu, and Rada Mihalcea. Learning to grade short answer questions using semantic similarity measures and dependency graph alignments. In ACL, pp. 752{762. The Association for Computer Linguistics, 2011.

Christian Guetl. Moving towards a fully automatic knowledge assessment tool. iJET, 3(1), 2008.

Sumit Basu, Chuck Jacobs, and Lucy Vanderwende. Powergrading: a clustering approach to amplify human effort for short answer grading. TACL, 1:391-402, 2013.

P. Wiemer-Hastings and I. Zipitria. Rules for syntax, vectors for semantics. In Proc. of the 23rd Annual Conference of the Cognitive Science Society, NJ, 2001.

Aly A Fahmy Wael H Gomaa. Short Answer Grading Using String Similarity and Corpus-Based Similarity. International Journal of Advanced Computer Science and Applications(IJACSA), 3(11), 2012.

Wael H Gomaa and Aly A Fahmy. Tapping into the power of automatic scoring. In the eleventh International Conference on Language Engineering, Egyptian Society of Language Engineering (ESOLEC'2011), 2011.

Michael Mohler and Rada Mihalcea. Text-to-text semantic similarity for automatic short answer grading. In Proc. of the 12th Conference of the European Chapter of the Association for Computational Linguistics, pp. 567-575. Association for Computational Linguistics, 2009.

Peter M. Wiemer-Hastings, Arthur C. Graesser, and Derek Harter. The foundations and architecture of autotutor. In Intelligent Tutoring Systems, vol. 1452 of Lecture Notes in Computer Science, pp. 334-343. Springer, 1998.

Myroslava Dzikovska, Rodney D. Nielsen, and Chris Brew. Towards effective tutorial feedback for explanation questions: A dataset and baselines. In HLT-NAACL, pp. 200{210. The Association for Computational Linguistics, 2012.

T. Mitchell, T. Russell, P. Broomhead, and N. Aldridge. Towards robust computerized marking of free-text responses. Proc. of 6th International Computer Aided Assessment Conference, 2002.

P. Resnik. Using information content to evaluate semantic similarity in a taxonomy. Proc. of the 14th International Joint Conference on Artificial Intelligence, 1:448{453, 1995.

Arthur C. Graesser, Peter M. Wiemer-Hastings, Katja Wiemer-Hastings, Derek Harter, and Natalie K. Person. Using latent semantic analysis to evaluate the contributions of students in autotutor. Interactive Learning Environments, 8(2):129{147, 2000.

\* cited by examiner

400A

SECTION: XII D      ROLL NUMBER: SAMANYU .D

ANSWER THE FOLLOWING QUESTIONS:

1. WHAT IS THE UNEXPECTED FACT STATED BY THE WRITER?
   THE WEIRD/UNEXPECTD FACT STATED HERE IS THAT EVEN WITH
   ALL TECHNOLOGICAL PROGRESS AND DEVELOPED AMENITIES, THE
   PROBLEM OF PHYSICAL DISTRESS STILL LINGERS ON.

2. WHAT IS RSI?
   REPETITIVE STRESS INJURY OR RSI IS THAT TYPE OF INJURY CAUSED DUE
   TO REPETITIVE MOTION FOR A LONG TIME.

3. WHAT IS THE CHIEF REASON FOR CAUSING RSI?
   SPENDING TOO MUCH TIME IN FRONT OF THE COMPUTER OR
   DOING OTHER SUCH WORK CAUSES RSI.

4. GIVE TWO EXAMPLES OF PEOPLE WHO ARE MOST VULNERABLE TO RSI?
   THE TYPIST AND PEOPLE WORKING IN SMALL SCALE INDUSTRIES.

5. IS IT CORRECT THAT SMALL CHILDREN CANNOT HAVE RSI?
   FALSE.

6. ACCORDING TO THE US BUREAU OF LABOUR STATISTICS WHAT
   PERCENTAGE OF OCCUPATIONAL INJURIES WERE NOT RSI?
   52%

FIG. 4A

| METADATA | | QUESTIONS | | | | |
|---|---|---|---|---|---|---|
| ROLL NO. | SECTION | WHAT IS THE UNEXPECTED FACT STATED BY THE WRITER? | WHAT IS RSI? | WHAT IS THE CHIEF REASON FOR CAUSING RSI? | GIVE TWO EXAMPLES OF PEOPLE WHO OR MOST VULNERABLE TO RSI. | IS IT CORRECT THAT SMALL CHILDREN CANNOT HAVE RSI? | ACCORDING TO THE US BUREAU OF LABOUR STATISTICS WHAT PERCENTAGE OF OCCUPATIONAL INJURIES WERE NOT RSI? |
| SAMANYU D | XIID | THE WEIRD/UNEXPECTD FACT STATED HERE IS THAT EVEN WITH ALL TECHNOLOGIES PROGRESS AND DEVELOPED AMENITIES, THE PROBLEM OF PHYSICAL DISTRESS STILL LINGERS ON. | REPETITIVE STRESS INJURY OR RSI IS THAT TYPE OF INJURY CAUSED DUE TO REPETITIVE MOTION FOR A LONG TIME. | SPENDING TOO MUCH TIME IN FRONT OF THE COMPUTER OR DOING OTHER SUCH WORK CAUSES RSI. | THE TYPIST AND PEOPLE WORKING IN SMALL SCALE INDUSTRIES. | FALSE. | 0.52 |
| RESPONSES | | | | | | |

METHOD AND SYSTEM FOR RESPONSE EVALUATION OF USERS FROM ELECTRONIC DOCUMENTS

TECHNICAL FIELD

The presently disclosed embodiments are related, in general, to a computerized evaluation system. More particularly, the presently disclosed embodiments are related to a method and a system for response evaluation of users from electronic documents.

BACKGROUND

Advancements in the field of computer science and information technology have led to the usage of computer assisted assessment (CAA) as one of the popular modes for evaluating responses for one or more questions. Such one or more questions may correspond to various categories. One of such categories of questions corresponds to multiple choice questions (MCQs) for which the responses are from limited choices. Other of such categories of questions corresponds to open-ended questions for which the responses are in free-text.

Typically, for multiple choice questions (MCQs), a user provides constrained responses. Thus, such assessment may not be reliable as the responses may be based on guess work. Further, presence of alternative responses providing inadvertent hints may change nature of problem-solving and reasoning skills of the candidate. Furthermore, acquired knowledge of the candidate may not be appropriately measured due to hypothetical reasoning and self-explanation, specifically in science courses. On the other hand, for open-ended questions, the user may integrate, synthesize, design, and communicate the ideas in natural language. Thus, such free-text responses provided by different users may be different for the same question. The difference in responses may occur due to linguistic variations in responses (i.e., multiple ways of expressing the same response), subjectivity of question (i.e., multiple correct responses) and topical variation (i.e., science vs literature) with respect to various factors, such as, subject matter, level of students, length and type of text. Usually, the CAA technique developed for evaluation of the free-text responses works for certain scenarios (i.e., for certain datasets) without considering the above mentioned variations. Therefore, an improved CAA technique for evaluation of the free-text responses with enhanced quality and accuracy is desirable.

Further limitations and disadvantages of conventional and traditional approaches will become apparent to one of skilled in the art through a comparison of the described systems with some aspects of the present disclosure, as set forth in the remainder of the present application and with reference to the drawings.

SUMMARY

According to embodiments illustrated herein, there is provided a method for response evaluation. The method includes extracting, by a document processor, one or more questions and a first response pertaining to each of the one or more questions from one or more first electronic documents. The one or more first electronic documents may be received from a first user-computing device over a communication network. The method further includes extracting, by the document processor, a second response pertaining to each of the one or more extracted questions and metadata from one or more second electronic documents. The one or more second electronic documents may be received from a second user-computing device over a communication network. For the second response pertaining to each of the one or more extracted questions, the method further includes determining, by a processor, a score based on one or more similarity measures that correspond to a category of each of the one or more extracted questions. The method further includes rendering, by the processor, the response evaluation on a user interface displayed on a display screen. The response evaluation comprises at least the determined score for the second response pertaining to each of the one or more extracted questions.

According to embodiments illustrated herein, there is provided a system for response evaluation. The system includes a document processor that is configured to extract one or more questions and a first response pertaining to each of the one or more questions from one or more first electronic documents received from a first user-computing device over a communication network. The document processor is further configured to extract a second response pertaining to each of the one or more extracted questions and metadata from one or more second electronic documents received from a second user-computing device over the communication network. For the second response pertaining to each of the one or more extracted questions, the system includes a processor that is configured to determine a score based on one or more similarity measures that correspond to a category of each of the one or more extracted questions. The processor is further configured to render the response evaluation on a user interface displayed on a display screen. The response evaluation comprises at least the determined score for the second response pertaining to each of the one or more extracted questions.

According to embodiments illustrated herein, there is provided a computer program product for use with a computer, the computer program product comprising a non-transitory computer readable medium, wherein the non-transitory computer readable medium stores a computer program code for response evaluation. The computer program code is executable by a processor in a server to extract one or more questions and a first response pertaining to each of the one or more questions from one or more first electronic documents received from a first user-computing device over a communication network. The computer program code is further executable by the processor in the server to extract a second response pertaining to each of the one or more extracted questions and metadata from one or more second electronic documents received from a second user-computing device over the communication network. For the second response pertaining to each of the one or more extracted questions, the computer program code is further executable by a processor in a server to determine a score based on one or more similarity measures that correspond to a category of each of the one or more extracted questions. The computer program code is further executable by the processor in the server to render the response evaluation on a user interface displayed on a display screen. The response evaluation comprises at least the determined score for the second response pertaining to each of the one or more extracted questions.

BRIEF DESCRIPTION OF DRAWINGS

The accompanying drawings illustrate various embodiments of systems, methods, and other aspects of the disclosure. Any person having ordinary skill in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit the scope in any manner, wherein like designations denote similar elements, and in which:

FIGS. 4A and 4B illustrate exemplary response documents, in accordance with at least one embodiment.

DETAILED DESCRIPTION

Figure 1:
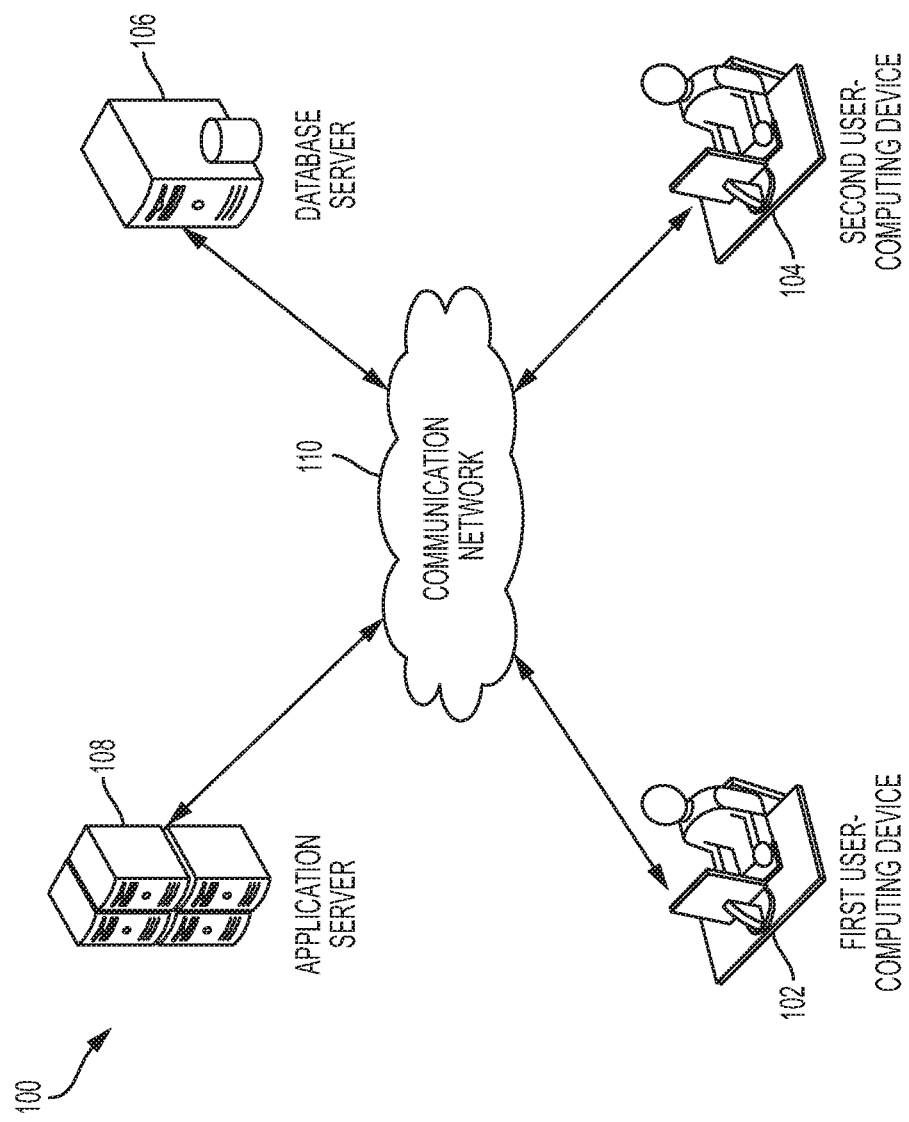
FIG. 1 is a block diagram that illustrates a system environment in which various embodiments may be implemented, in accordance with at least one embodiment.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the method and system may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment," "an embodiment," "at least one embodiment," "one example," "an example," "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Definitions: The following terms shall have, for the purposes of this application, the respective meanings set forth below.

A "user-computing device" refers to a computer, a device (that includes one or more processors/microcontrollers and/or any other electronic components), or a system (that performs one or more operations according to one or more sets of programming instructions, code, or algorithms) associated with a user. For example, a user may utilize a user-computing device to transmit one or more requests and associated data to a computing server. In another exemplary scenario, a user may utilize a user-computing device to submit one or more responses pertaining to one or more requests to a computing server. Examples of the user-computing device may include, but are not limited to, a desktop computer, a laptop, a personal digital assistant (PDA), a mobile device, a smartphone, and a tablet computer (e.g., iPad® and Samsung Galaxy Tab®).

A "first user" refers to an individual who may determine one or more queries or questions based on one or more portions or concepts associated with one or more subjects of interest. In an embodiment, the first user may utilize a first user-computing device to transmit the determined one or more queries or questions to a computing server. The first user may further transmit one or more sample responses (as determined by the first user) pertaining to the one or more queries or questions to the computing server. Further, in an embodiment, the first user may utilize the first user-computing device to view one or more evaluated reports of one or more other users (e.g., one or more students). Examples of the first user may include, but are not limited to, an instructor, a subject expert, a teacher, and/or the like.

A "first electronic document" refers to a document in an electronic form that comprises at least one or more queries and a corresponding model response to each of the one or more queries as provided by a first user. In an embodiment, the first user may transmit the first electronic document to a computing server over a communication network. In an embodiment, the first electronic document may be represented in various file formats, such as, JPG or JPEG, GIF, TIFF, PNG, BMP, RAW, PSD, PSP, PDF, MS Word, MS Excel, and/or the like.

A "second user" refers to an individual who may utilize a second user-computing device to provide one or more responses pertaining to one or more queries or questions in an electronic document received from a computing server or a first user-computing device over a communication network. Further, in an embodiment, the second user may utilize the second user-computing device to view his/her evaluated report received from the computing server or the first user-computing device. Further, in an embodiment, the second user may utilize the second user-computing device to revoke the received evaluated report in case the second user is not satisfied with the evaluation. Examples of the second user may include, but are not limited to, a student, a learner, a customer, a consumer, a client, and/or the like.

A "second electronic document" refers to a document in an electronic form that comprises at least one or more queries and a corresponding response to each of the one or more queries as provided by a second user. The second electronic document may further include metadata associated with the second user. For example, the metadata may comprise one or more of, but are not limited to, a name, a grade, a roll number, a class, and a section of the second user. In an embodiment, the second user may transmit the second electronic document to a computing server or a first user-computing device over a communication network for evaluation. In an embodiment, the second electronic document may be represented in various file formats, such as, JPG or JPEG, GIF, TIFF, PNG, BMP, RAW, PSD, PSP, PDF, MS Word, MS Excel, and/or the like.

A "first response" refers to a pre-defined response, pertaining to each of one or more queries or questions, provided by a first user in a first electronic document. In an embodiment, the first response may correspond to a free-text response, or a short free-text response.

A "second response" refers to a response, pertaining to each of one or more queries or questions, provided by a second user in a second electronic document. The second response may include one or more textual data provided by the second user in response to each of the one or more queries or questions in the second electronic document. In an embodiment, the second response may correspond to a free-text response or a short free-text response (e.g., response that is a few tens words in length).

"Metadata" may refer to personal information of a second user in a second electronic document. In an embodiment, the metadata may include one or more of, but are not limited to, a name, a grade, a roll number, a class, and a section of the second user.

A "score" refers to a numerical value or a grade that may be determined for a second response pertaining to a question by a computing server. In an embodiment, the score may be determined based on one or more similarity measures that correspond to a category associated with the question.

A "similarity measure" refers to a measure of a degree that is representative of a similarity between a first response (in a first electronic document) and a second response (in a second electronic document) pertaining to a question. In an embodiment, the similarity measure may correspond to one of, but are not limited to, a lexical similarity measure, a syntactic similarity measure, a semantic similarity measure, and a vector space similarity measure.

A "lexical similarity measure" corresponds to a measure of degree that is representative of similarity between words or lexemes of at least two electronic documents in at least two different languages. For example, a word "apple" in English language is lexically similar to a word "manzana" in Spanish language.

A "syntactic similarity measure" corresponds to a measure of degree that is representative of grammatical similarity between at least two sentences of at least two electronic documents. For example, a first sentence, such as, "Mr. X use metro to reach office," in a first electronic document is syntactically similar to a second sentence, such as, "Mr. X reach office by metro" in a second electronic document.

A "semantic similarity measure" corresponds to a measure of degree that is representative of similarity between at least two words of at least two electronic documents with respect to meaning of the at least two words. For example, a word, such as, "automobile," in a first electronic document is semantically similar to a word, such as, "car," in a second electronic document.

A "vector space similarity measure" corresponds to a measure of degree that is representative of similarity between at least two words of at least two electronic documents. In an embodiment, the degree of similarity may be measured based on at least a distance and/or a cosine angle between the at least two words. Example of a distance between at least two words may include, but are not limited to, a "Euclidian distance," a "Levenshtein distance," and/or the like. For example, an occurrence of a word, say "A," in a first response is once and an occurrence of a word, say "B" in the first response is twice. Similarly, the occurrence of the word, say "A," in a second response is twice and the occurrence of the word, say "B" in the second response is four times. In such case, the distance and/or the cosine angle between words "A" and "B" will be the same. Hence, the first response will be similar to the second response.

"One or more categories" refer to one or more groups of one or more questions that are determined based on at least a type and content of the one or more questions in an electronic document. In an embodiment, the one or more categories may correspond to one or more of, but are not limited to, a verification category, a disjunctive category, a concept completion category, a feature specification category, a quantification category, a definition category, an example category, a comparison category, an interpretation category, a casual antecedent category, a casual consequence category, a goal orientation category, an instrumental/procedural category, an enablement category, an expectational category, and a judgmental category. In an embodiment, the one or more categories may be defined based on at least grammatical meaning of words/lexicals associated with the one or more questions. For example, a question, such as, "how many countries are in Africa," may be categorize into a "quantification category."

A "verification category" corresponds to a group that may include one or more questions that solicit mainly one word response, either negating or affirming a fact which may be followed by a sentence elaborating the same meaning. For example, a question, such as, "is a fact true" may be classified in the verification category. In an embodiment, the verification category may be associated with a syntactic similarity measure.

A "disjunctive category" corresponds to a group that may include one or more questions that solicit a response derived from a question itself. For example, the question, such as, "is x or y the case" may be classified in the disjunctive category. In an embodiment, the disjunctive category may be associated with a lexical similarity measure followed by a vector space similarity measure.

A "concept completion category" corresponds to a group that may include one or more questions that solicit a response to "who," "what," "where," and "when." For example, a question, such as, "who ran this experiment" may be classified in the concept completion category. In an embodiment, the concept completion category may be associated with a lexical similarity measure.

A "feature specification category" corresponds to a group that may include one or more questions that solicit a response as a specific description. For example, a question, such as, "what color is the flower" may be classified in the feature specification category. In an embodiment, the feature specification category may be associated with a lexical similarity measure followed by a vector space similarity measure.

A "quantification category" corresponds to a group that may include one or more questions that solicit a response as a value of a quantitative variable. For example, a question, such as, "how many countries are in Africa" may be classified in the quantification category. In an embodiment, the quantification category may be associated with a syntactic similarity measure.

A "definition category" corresponds to a group that may include one or more questions that solicit a response as a meaning of certain term. For example, a question, such as, "What does an interaction mean?" may be classified in the definition category. In an embodiment, the definition category may be associated with a syntactic similarity measure followed by a semantic similarity measure.

An "example category" corresponds to a group that may include one or more questions that solicit a response as an example of certain term. For example, a question, such as, "What does an example of an ordinal scale" may be classified in the example category. In an embodiment, the example category may be associated with a syntactic similarity measure.

A "comparison category" corresponds to a group that may include one or more questions that solicit a response based on comparison of at least two terms. For example, a question, such as, "in which way India is similar to China" may be classified in the comparison category. In an embodiment, the comparison category may be associated with a syntactic similarity measure followed by a semantic similarity measure.

An "interpretation category" corresponds to a group that may include one or more questions that solicit a response based on interpretation of information. For example, a question, such as, "does that graph show an effect of A" may be classified in the interpretation category. In an embodiment, the interpretation category may be associated with a semantic similarity measure.

A "casual antecedent category" corresponds to a group that may include one or more questions that solicit a response including reason of occurrence of an event or state. For example, a question, such as, "why is a kite going backward" may be classified in the casual antecedent category. In an embodiment, the casual antecedent category may be associated with a semantic similarity measure followed by a lexical similarity measure.

A "casual consequence category" corresponds to a group that may include one or more questions that solicit a response including consequences of an event or state. For example, a question, such as, "what happens to the kite when it reach the mountain" may be classified in the casual consequence category. In an embodiment, the casual consequence category may be associated with a semantic similarity measure.

A "goal orientation category" corresponds to a group that may include one or more questions that solicit a response focused on goal of an action. For example, a question, such as, "what was the purpose of cutting that tree" may be classified in the goal orientation category. In an embodiment, the goal orientation category may be associated with a semantic similarity measure.

An "instrumental/procedural category" corresponds to a group that may include one or more questions that solicit a response focused on a procedure to achieve a target. For example, a question, such as, "how does a person climb on a mountain" may be classified in the instrumental/procedural category. In an embodiment, the instrumental/procedural category may be associated with a syntactic similarity measure.

An "enablement category" corresponds to a group that may include one or more questions that solicit a response focused on enablement of an object or a resource to perform certain action. For example, a question, such as, "which device allows you to measure stress" may be classified in the enablement category. In an embodiment, the enablement category may be associated with a syntactic similarity measure followed by a semantic similarity measure.

An "expectational category" corresponds to a group that may include one or more questions that solicit a response focused on an expectation for an event to happen. For example, a question, such as, "why wasn't that game completed?" may be classified in the expectational category. In an embodiment, the expectational category may be associated with a semantic similarity measure.

A "judgmental category" corresponds to a group that may include one or more questions that solicit a response to judge an idea or to provide an advice. For example, a question, such as, "what should I do to reach home on time" may be classified in the judgmental category. In an embodiment, the judgmental category may be associated with a semantic similarity measure.

FIG. 1 is a block diagram that illustrates a system environment in which various embodiments may be implemented. With reference to FIG. 1, there is shown a system environment 100 that includes a first user-computing device 102, a second user-computing device 104, a database server 106, an application server 108, and a communication network 110. Various devices in the system environment 100 may be interconnected over the communication network 110. FIG. 1 shows, for simplicity, one first user-computing device 102, one second user-computing device 104, one database server 106, and one application server 108. However, it will be apparent to a person having ordinary skill in the art that the disclosed embodiments may also be implemented using multiple first user-computing devices, multiple second user-computing devices, multiple database servers, and multiple application servers without departing from the scope of the disclosure.

The first user-computing device 102 may refer to a computing device (associated with a first user) that may be communicatively coupled to the communication network 110. The first user may correspond to an individual, such as, a teacher, an instructor, a trainer, and/or the like. In an embodiment, the first user-computing device 102 may comprise one or more processors in communication with one or more memories. The one or more memories may include one or more computer readable code, instructions, programs, or algorithms that are executable by the one or more processors to perform one or more associated operations.

In an embodiment, the first user may utilize the first user-computing device 102 to communicate with the second user-computing device 104, the database server 106, or the application server 108 over the communication network 110. In an embodiment, the first user may utilize the first user-computing device 102 to generate one or more first electronic documents. The one or more first electronic documents may comprise one or more questions and/or corresponding first responses. The first user may determine the one or more questions based on at least one or more portions or content associated with one or more subjects of interests. The first user may further utilize the first user-computing device 102 to prepare a first response (i.e., a model response) corresponding to each of the one or more questions. Thereafter, the first user may utilize the first user-computing device 102 to transmit the one or more first electronic documents to at least one of the database server 106 or the application server 108 over the communication network 110. In another embodiment, the first user may utilize the first user-computing device 102 to transmit one or more second electronic documents that may include the one or more questions to the second user-computing device 104.

In an embodiment, the first user-computing device 102 may include a display screen that may be configured to display one or more user interfaces to the first user. For example, the application server 108 may render a user interface displaying an evaluation report of a student on the display screen of the first user-computing device 102. The evaluation report includes a score and a feedback for each response pertaining to each of the one or more questions. The first user may utilize the first user-computing device 102 to view or review the evaluation report. Based on the review, in case the first user determines that the evaluation report is not accurate, the first user may utilize the 102 to correct or update the evaluation report of the student.

The first user-computing device 102 may correspond to various types of computing devices, such as, but are not limited to, a desktop computer, a laptop, a PDA, a mobile device, a smartphone, a tablet computer (e.g., iPad® and Samsung Galaxy Tab®), and/or the like.

The second user-computing device 104 may refer to a computing device (associated with a second user) that may be communicatively coupled to the communication network 110. The second user may correspond to an individual, such as, a student, a learner, a customer, a consumer, a client, and/or the like. The second user may utilize the second user-computing device 104 to take one or more computerized tests. The second user-computing device 104 may comprise one or more processors in communication with one or more memories. Further, in an embodiment, the one or more processors may be operable to execute one or more sets of computer readable code, instructions, programs, or algorithms, stored in the one or more memories, to perform one or more associated operations.

In an embodiment, the second user may utilize the second user-computing device 104 to communicate with the first user-computing device 102, the application server 108 or the database server 106 over the communication network 110 (e.g., using wired or wireless communication capabilities). In an embodiment, the second user may utilize the second user-computing device 104 to receive the one or more second electronic documents from the first user-computing device 102 and/or the application server 108 over the communication network 110. The one or more second electronic documents may include the one or more questions that the second user may be required to respond. After receiving the one or more second electronic documents, the second user may utilize the second user-computing device 104 to provide metadata (e.g., name, class, section, employee identification number, and/or the like) in the one or more second electronic documents. Further, the second user may utilize the second user-computing device 104 to provide a second response pertaining to each of the one or more questions in the one or more second electronic documents. Thereafter, the second user may utilize the second user-computing device 104 to transmit the one or more second electronic documents comprising at least the one or more questions, the second response pertaining to each of the one or more questions and the metadata, to the first user-computing device 102, the database server 106, or the application server 108.

Further, in an embodiment, the second user may utilize the second user-computing device 104 to view his/her evaluation report. The evaluation report comprises the score and the feedback for each response pertaining to each of the one or more questions. In case the second user is not satisfied with the evaluation report, the second user may utilize the second user-computing device 104 to revoke the evaluation report.

The second user-computing device 104 may correspond to various types of computing devices, such as, but are not limited to, a desktop computer, a laptop, a PDA, a mobile device, a smartphone, a tablet computer (e.g., iPad® and Samsung Galaxy Tab®), and/or the like.

The database server 106 may refer to a computing device that may be communicatively coupled to the communication network 110. The database server 106 may be configured to store one or more electronic documents, such as, the one or more first electronic documents and the one or more second electronic documents. The database server 106 may receive the one or more first electronic documents from the first user-computing device 102 or the application server 108 over the communication network 110. The database server 106 may receive the one or more second electronic documents from the second user-computing device 104 or the application server 108 over the communication network 110. Further, in an embodiment, the database server 106 may be configured to store the metadata of each of one or more second users. For example, the metadata of a second user may include one or more of, but are not limited to, a name, a grade, a roll number, a class, and a section of the second user. The database server 106 may further be configured to store the evaluation report of each of the one or more second users. The evaluation report may comprise the score determined for the second response pertaining to each of the one or more questions in the one or more second electronic documents. The evaluation report may further comprise the feedback associated with the second response.

Further, in an embodiment, the database server 106 may receive one or more queries from the first user-computing device 102, the second user-computing device 104, or the application server 108 to retrieve the one or more electronic documents or the evaluation report of the one or more second users. For querying the database server 106, one or more querying languages may be utilized, such as, but are not limited to, SQL, QUEL, DMX and so forth. Further, the database server 106 may be realized through various technologies, such as, but are not limited to, Microsoft® SQL server, Oracle®, and MySQL®. In an embodiment, the application server 108 may connect to the database server 106 using one or more protocols, such as, but not limited to, ODBC protocol and JDBC protocol.

The application server 108 may refer to a computing device or a software framework hosting an application or a software service that may be communicatively coupled to the communication network 110. In an embodiment, the application server 108 may be implemented to execute procedures such as, but not limited to, one or more sets of programs, routines, or scripts stored in one or more memories for supporting the hosted application or the software service. In an embodiment, the hosted application or the software service may be configured to perform one or more pre-defined operations. In an embodiment, the application server 108 may receive the one or more first electronic documents from the first user-computing device 102 over the communication network 110. Further, in an embodiment, the application server 108 may receive the one or more second electronic documents from the first user-computing device 102 and/or the second user-computing device 104 over the communication network 110. Further, in an embodiment, the application server 108 may be configured to extract the one or more questions and the first response pertaining to each of the one or more questions from the one or more first electronic documents. Further, in an embodiment, the application server 108 may be configured to extract the second response pertaining to each of the one or more extracted questions and the metadata from the one or more second electronic documents. The extraction of the one or more questions, the first response, the second response and the metadata has been explained in detail in conjunction with FIG. 3.

In an embodiment, for the second response pertaining to each of the one or more extracted questions, the application server 108 may further be configured to determine the score based on one or more similarity measures that correspond to a category of each of the one or more extracted questions. The application server 108 may further be configured to provide the feedback for the second response pertaining to each of the one or more extracted questions. Further, in an embodiment, the application server 108 may be configured to generate the evaluation report of each of the one or more second users, such as, the second user associated with the second user-computing device 104. The evaluation report comprises the score and the feedback pertaining to each second response in the one or more second electronic documents. The generation of the evaluation report has been explained in detail in conjunction with FIG. 3.

Examples of the application server 108 may include, but are not limited to, a relational database server, a SAP® server, a PeopleSoft® server, a Siebel® server, and the like.

For querying the application server 108, one or more querying languages may be utilized, such as, but are not limited to, SQL, QUEL, DMX and so forth. In an embodiment, the first user-computing device 102 and/or the second user-computing device 104 may connect to the application server 108 using one or more protocols such as, but not limited to, ODBC protocol and JDBC protocol.

The communication network 110 may include a medium through which devices, such as, the first user-computing device 102, the second user-computing device 104, the database server 106, and the application server 108, may communicate with each other. Examples of the communication network 110 may include, but are not limited to, the Internet, a cloud network, a Wireless Fidelity (Wi-Fi) network, a Wireless Local Area Network (WLAN), a Local Area Network (LAN), a wireless personal area network (WPAN), a Wireless Local Area Network (WLAN), a wireless wide area network (WWAN), a cloud network, a Long Term Evolution (LTE) network, a plain old telephone service (POTS), and/or a Metropolitan Area Network (MAN). Various devices in the system environment 100 may be configured to connect to the communication network 110, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, such as, Long Term Evolution (LTE), Light Fidelity (Li-Fi), and/or other cellular communication protocols or Bluetooth (BT) communication protocols.

Figure 2:
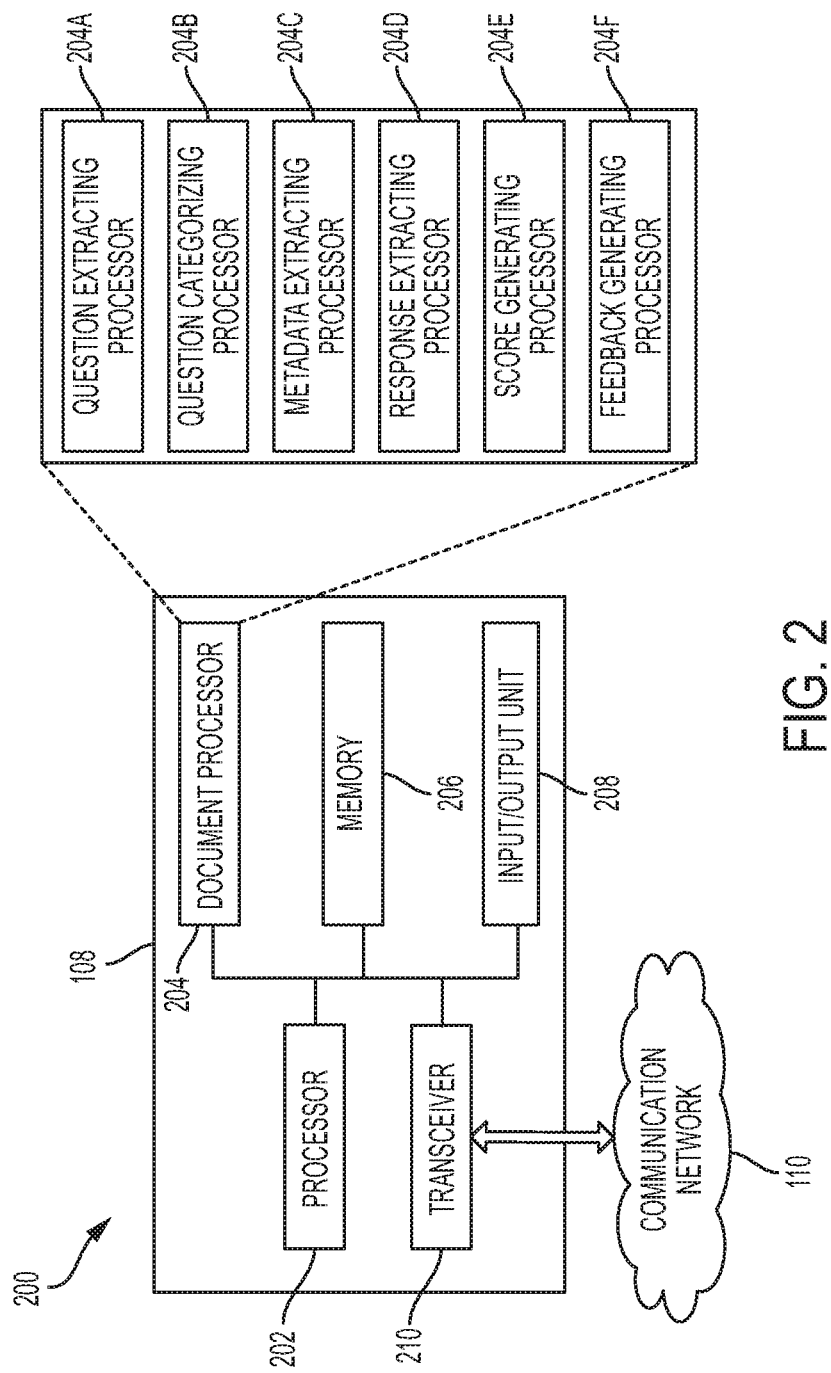
FIG. 2 is a block diagram that illustrates various elements of a computing server, in accordance with at least one embodiment.

FIG. 2 is a block diagram that illustrates various components of a computing server, in accordance with at least one embodiment. With reference to FIG. 2, there is shown the computing server, such as, the application server 108 that is explained in conjunction with FIG. 1. The application server 108 may include one or more processors, such as, a processor 202, one or more document processors, such as, a document processor 204, one or more memory units, such as, a memory 206, one or more input/output (I/O) units, such as, an I/O unit 208, and one or more transceivers, such as, a transceiver 210. A person having ordinary skill in the art will appreciate that the scope of the disclosure is not limited to the components as described herein, and other specialized circuitries and components may also be utilized to realize the various functionalities of the application server 108, without limiting the scope of the disclosure.

The processor 202 may comprise suitable logic, circuitry, interface, and/or code that may be configured to execute one or more sets of instructions stored in the memory 206. The processor 202 may be communicatively coupled to the document processor 204, the memory 206, the I/O unit 208, and the transceiver 210. The processor 202 may execute the one or more sets of instructions, programs, code, and/or scripts stored in the memory 206 to perform one or more pre-defined operations. For example, the processor 202 may operate in conjunction with the document processor 204, the memory 206, the I/O unit 208, and the transceiver 210, to render the evaluation report, comprising the response evaluation, on the user interface displayed on the display screen of the first user-computing device 102 and/or the second user-computing device 104. The processor 202 may be implemented based on a number of processor technologies known in the art. Examples of the processor 202 include, but are not limited to, an X86-based processor, a Reduced Instruction Set Computing (RISC) processor, an Application-Specific Integrated Circuit (ASIC) processor, a Complex Instruction Set Computing (CISC) processor, a microprocessor, a microcontroller, and/or the like.

The document processor 204 may comprise suitable logic, circuitry, interface, and/or code that may be configured to execute the one or more sets of instructions stored in the memory 206. The document processor 204 may be communicatively coupled to the processor 202, the memory 206, the I/O unit 208, and the transceiver 210. The document processor 204 may execute the one or more sets of instructions, programs, code, and/or scripts stored in the memory 206 to perform one or more pre-defined operations. Further, in an embodiment, the document processor 204 may comprise one or more specialized processing components to perform the one or more pre-defined operations. For example, the document processor 204 may comprise a question extracting processor 204A, a question categorizing processor 204B, a metadata extracting processor 204C, a response extracting processor 204D, a score generating processor 204E, and a feedback generating processor 204F. The question extracting processor 204A may be configured to extract the one or more questions from the one or more first electronic documents. The question categorizing processor 204B may be configured to categorize each of the one or more extracted questions into one or more categories based on at least a type and content of each of the one or more extracted questions. The metadata extracting processor 204C may be configured to extract the metadata from the one or more second electronic documents. The response extracting processor 204D may be configured to extract the first response and the second response pertaining to each of the one or more extracted questions from the one or more first electronic documents and the one or more second electronic documents, respectively. The score generating processor 204E may be configured to generate the score for the second response pertaining to each of the one or more extracted questions in the one or more second electronic documents. The feedback generating processor 204F may be configured to generate a feedback pertaining to the second response. The document processor 204 and the one or more specialized processing components may be implemented based on a number of processor technologies known in the art. Examples of the document processor 204 and the one or more specialized processing components include, but are not limited to, a word processor, an X86-based processor, a RISC processor, an ASIC processor, a CISC processor, a microprocessor, a microcontroller, and/or the like.

Though, the document processor 204 is depicted as independent from the processor 202 in FIG. 2, a person skilled in the art will appreciate that the document processor 204 may be implemented within the processor 202 without departing from the scope of the disclosure. Further, a person skilled in the art will appreciate that the processor 202 may be configured to perform the functionalities of the document processor 204 without departing from the scope of the disclosure.

The memory 206 may comprise suitable logic, circuitry, code, and/or interfaces that may be configured to store one or more machine code and/or computer programs having at least one code section executable by the processor 202 and/or the document processor 204 to perform the one or more pre-defined operations. In an embodiment, the memory 206 may be configured to store the one or more first electronic documents received from the first user-computing device 102. The memory 206 may further be configured to store the one or more second electronic documents received from the second user-computing device 104. In an embodiment, the memory 206 may be configured to store the one or more extracted questions, the first response pertaining to each of the one or more extracted questions, the second response pertaining to each of the one or more extracted questions, and the metadata of the second user. Some of the commonly known memory implementations include, but are not limited to, a random access memory (RAM), a read only memory (ROM), a hard disk drive (HDD), and a secure digital (SD) card. It will be apparent to a person having ordinary skill in the art that the one or more sets of instructions, programs, code, and/or scripts stored in the memory 206 may enable the hardware of the application server 108 to perform the one or more predetermined operations.

The I/O unit 208 may comprise suitable logic, circuitry, interfaces, and/or code that may be operable to receive the one or more first electronic documents and the one or more second electronic documents from the first user-computing device 102 and the second user-computing device 104, respectively, through the transceiver 210 over the communication network 110. Further, the processor 202 may be configured to render the evaluation report, comprising the response evaluation, through the I/O unit 208, to the first user-computing device 102 and/or second user-computing device 104, over the communication network 110. The I/O unit 208 may be operable to communicate with the processor 202, the document processor 204, the memory 206, and the transceiver 210. Examples of the input devices may include, but are not limited to, a touch screen, a keyboard, a mouse, a joystick, a microphone, a camera, a motion sensor, a light sensor, and/or a docking station. Examples of the output devices may include, but are not limited to, a speaker system and a display screen.

The transceiver 210 may comprise suitable logic, circuitry, interfaces, and/or code that may be configured to communicate with the one or more devices, such as, the first user-computing device 102, the second user-computing device 104, and/or one or more servers, such as, the database server 106, over the communication network 110. The transceiver 210 may be configured to transmit or receive the one or more sets of instructions, queries, the one or more electronic documents, and/or the evaluation report to/from various components of the system environment 100. The transceiver 210 may implement one or more known technologies to support wired or wireless communication with the communication network 110. In an embodiment, the transceiver 210 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 210 may communicate via wireless communication with networks, such as, the Internet, an Intranet and/or a wireless network, such as, a cellular telephone network, a wireless local area network (LAN) and/or a metropolitan area network (MAN). The wireless communication may use any of a plurality of communication standards, protocols and technologies, such as, a Global System for Mobile Communications (GSM), an Enhanced Data GSM Environment (EDGE), a wideband code division multiple access (W-CDMA), a code division multiple access (CDMA), a time division multiple access (TDMA), a Bluetooth, a Wireless Fidelity (Wi-Fi) (e.g., IEEE 802.11a, IEEE 802.11b, IEEE 802.11g and/or IEEE 802.11n), a voice over Internet Protocol (VoIP), a Wi-MAX, a protocol for email, an instant messaging, and/or a Short Message Service (SMS).

Figure 3:
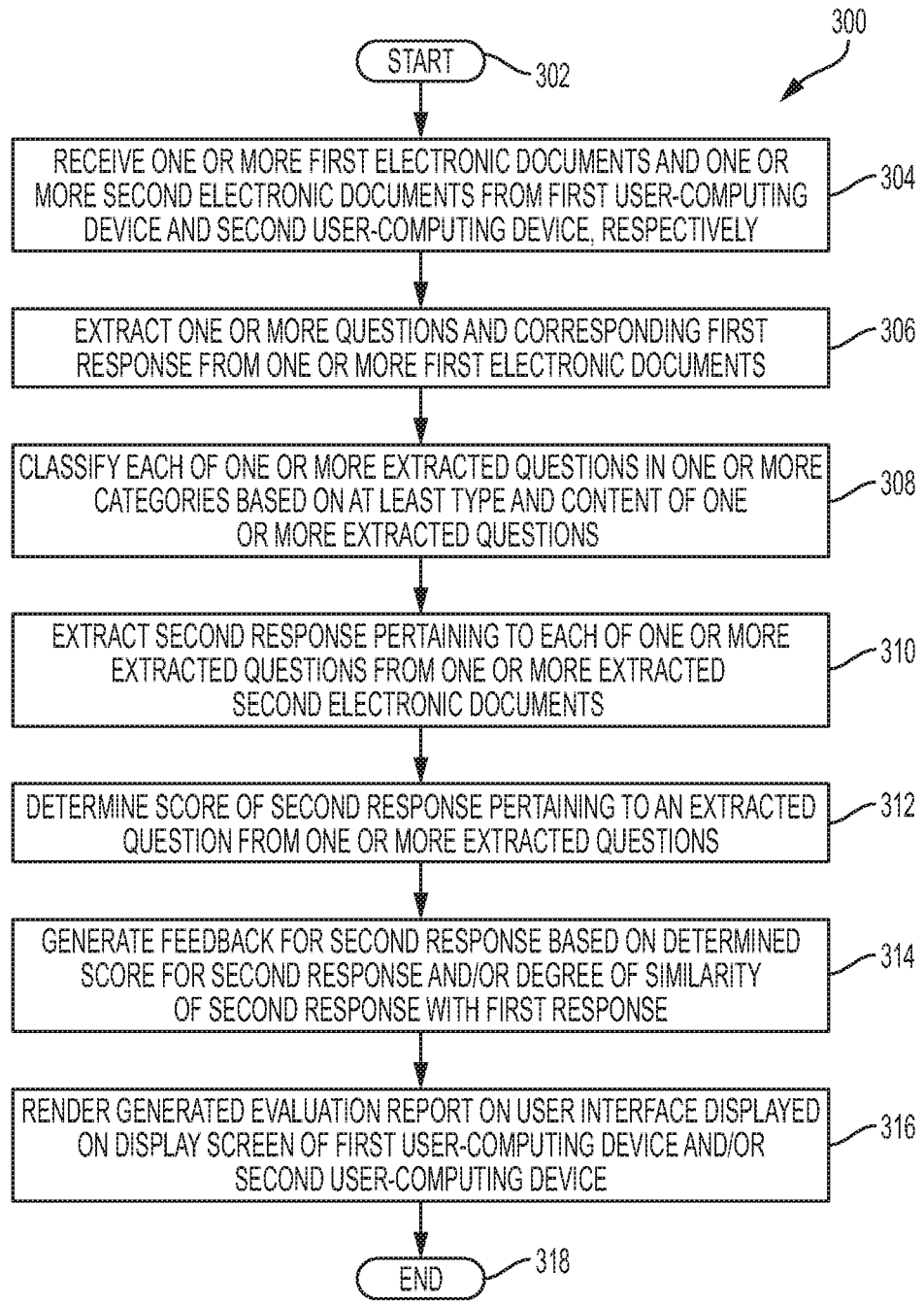
FIG. 3 is a flowchart that illustrates a method for response evaluation, in accordance with at least one embodiment.

FIG. 3 is a flowchart that illustrates a method for response evaluation, in accordance with at least one embodiment. With reference to FIG. 3, there is shown a flowchart 300 that has been described in conjunction with FIG. 1 and FIG. 2. The method starts at step 302 and proceeds to step 304.

At step 304, the one or more first electronic documents and the one or more second electronic documents are received from the first user-computing device 102 and the second user-computing device 104, respectively. In an embodiment, the transceiver 210 may be configured to receive the one or more first electronic documents and the one or more second electronic documents from the first user-computing device 102 and the second user-computing device 104, respectively, over the communication network 110. Thereafter, the transceiver 210 may store the received one or more first electronic documents and the received one or more second electronic documents in a storage device, such as, the memory 206 or the database server 106.

Prior to the reception of the one or more first electronic documents and the one or more second electronic documents by the transceiver 210, the first user, such as, an instructor, may utilize the first user-computing device 102 to generate the one or more first electronic documents. The one or more first electronic documents may comprise the one or more questions and the corresponding first responses. In an embodiment, the first user may determine the one or more questions based on at least the one or more portions or content associated with the one or more subjects of interests. Further, the first response pertaining to each of the one or more questions in the one or more first electronic documents may correspond to a free-text answer or a short free-text answer.

After generating the one or more first electronic documents, the first user may utilize the first user-computing device 102 to generate the one or more second electronic documents that comprise only the one or more questions. Thereafter, the first user may utilize the first user-computing device 102 to transmit the one or more second electronic documents to the second user-computing device 104 associated with the second user (e.g., a student) over the communication network 110. The second user may utilize the second user-computing device 104 to provide the second responses pertaining to the one or more questions in the one or more second electronic documents. The second responses may correspond to the free-text answer or the short free-text answer. Thereafter, the second user may utilize the second user-computing device 104 to transmit the one or more second electronic documents to the first user-computing device 102 over the communication network 110. The one or more second electronic documents may comprise the one or more questions and the corresponding second responses.

After receiving the one or more second electronic documents, the first user may utilize the first user-computing device 102 to transmit the one or more first electronic documents and the one or more second electronic documents to the application server 108 over the communication network 110. Thereafter, the transceiver 210 may store the received one or more first electronic documents and the received one or more second electronic documents in the storage device, such as, the memory 206 or the database server 106.

In another embodiment, after generating the one or more first electronic documents, the first user may utilize the first user-computing device 102 to transmit the one or more first electronic documents to the database server 106 or the application server 108 over the communication network 110. After receiving the one or more first electronic documents, the processor 202 in conjunction with the document processor 204 may generate the one or more second electronic documents comprising the one or more questions. Thereafter, the transceiver 210 may transmit the one or more one or more second electronic documents to the second user-computing device 104 associated with the second user over the communication network 110. The second user may utilize the second user-computing device 104 to provide the second response pertaining to each of the one or more questions in the one or more second electronic documents. The second responses may correspond to the free-text answer or the short free-text answer. Thereafter, the second user may utilize the second user-computing device 104 to transmit the one or more second electronic documents to the database server 106 or the application server 108 over the communication network 110. The one or more second electronic documents may comprise the one or more questions and the corresponding second response.

In certain scenarios, the first user and the second user may utilize one or more image scanning devices, such as, a multi-function device (MFD), to scan one or more hardcopies of the one or more first documents and/or the one or more second documents to generate the one or more first electronic documents and the one or more second electronic documents, respectively. Thereafter, the one or more first electronic documents and the one or more second electronic documents may be transmitted to the application server 108 over the communication network 110. Examples of the multi-function device may include, but are not limited to, a multi-function product, a multi-function printer and/or a multi-function peripheral device. In such a case, the one or more first electronic documents and the one or more second electronic documents may be stored in various file formats, such as, JPG or JPEG, GIF, TIFF, PNG, BMP, RAW, PSD, PSP, PDF, MS Word, MS Excel, and the like, in the database server 106.

Further, in an embodiment, the first user and the second user may provide the one or more first electronic documents and the one or more second electronic documents in a pre-defined format specified by an individual (e.g., an administrator) associated with a service provider. In an embodiment, the first user may also define the format of the one or more electronics documents that may be accepted by the processor 202. In a scenario, where the one or more first electronic documents and the one or more second electronic documents correspond to scanned copy of one or more first handwritten documents and one or more second handwritten documents, respectively, the processor 202 may be configured to generate the one or more first electronic documents and the one or more second electronic documents in the pre-defined format. Further, in an embodiment, the pre-defined format may be same or different for the submission of the one or more first electronic documents and the one or more second electronic documents by each of the first user and second user, respectively. The pre-defined formats for the submission of the one or more electronic documents, have been discussed later in detail with illustrative examples in conjunction with FIGS. 4A and 4B.

After reception of the one or more first electronic documents and the one or more second electronic documents, at step 306, the one or more questions and the corresponding first responses are extracted from the one or more first electronic documents. In an embodiment, the document processor 204 may be configured to extract the one or more questions and the corresponding first responses from the one or more first electronic documents.

Prior to the extraction of the one or more questions and the corresponding first responses from the one or more first electronic documents, the document processor 204 may transmit one or more queries to the storage device, such as, the database server 106 or the memory 206, to retrieve the one or more first electronic documents. After retrieving the one or more first electronic documents, in an embodiment, the question extracting processor 204A may be operable to extract the one or more questions from the one or more first electronic documents. The question extracting processor 204A may utilize one or more natural processing techniques known in the art to extract the one or more questions from the one or more first electronic documents. Further, in an embodiment, the response extracting processor 204D may be operable to extract the first response corresponding to each of the one or more questions in the one or more first electronic documents. The response extracting processor 204D may utilize one or more natural processing techniques known in the art to extract the first response corresponding to each of the one or more questions from the one or more first electronic documents. After extracting the one or more questions and the corresponding first responses from the one or more first electronic documents, the document processor 204 may store the extracted one or more questions and the corresponding extracted first responses in form of a data structure in the memory 206 or the database server 106.

At step 308, each of the one or more extracted questions is classified into the one or more categories based on at least the type and content of the one or more extracted questions. In an embodiment, the document processor 204 may be configured to classify each of the one or more extracted questions into the one or more categories based on at least the type and content of the one or more extracted questions. In an embodiment, the one or more categories may correspond to one or more of a verification category, a disjunctive category, a concept completion category, a feature specification category, a quantification category, a definition category, an example category, a comparison category, an interpretation category, a casual antecedent category, a casual consequence category, a goal orientation category, an instrumental/procedural category, an enablement category, an expectational category, and a judgmental category.

A person having ordinary skill in the art will understand that there exist a significant variations in types of the one or more questions that are asked to the second user, for example, during an assessment. The different types of the one or more questions elicit different types of the first response and/or the second response pertaining to each of the one or more questions. Therefore, in order to classify the one or more extracted questions into the one or more categories, the question categorizing processor 204B utilizes a standard taxonomy of questions that are known in the art. For example, the standard taxonomy of questions may be based on factors, such as, a degree of specification, a type, and/or content of the one or more extracted questions.

For example, Table 1 depicts illustrative examples of various one or more categories with corresponding taxonomy and sample examples.

TABLE 1

Illustration of the one or more categories

| Question category | Abstract specification | Example |
|---|---|---|
| Short Verifi- | Is a fact true? Did an | Is the answer 5? |

TABLE 1-continued

Illustration of the one or more categories

| Question category | | Abstract specification | Example |
|---|---|---|---|
| re-sponse | cation Category | event occur? | |
| | Disjunctive Category | Is x or y the case? Is X, Y, or Z the case? | Is gender or female the variable? |
| | Concept Completion Category | Who? What? What is the referent for a noun argument slot? | Who ran this experiment? |
| | Feature Specification Category | What qualitative attributes does entity x have? | What are the properties of a bar graph? |
| | Quantification Category | What is value of a quantitative variable? How many? | How many degrees of freedom are on this variable? |
| Long response | Definition Category | What does x mean? | What is a t test? |
| | Example Category | What is an example label or instance of the category x? | What is an example of a factorial design? |
| | Comparison Category | How is x similar to y? How is X different from Y? | What is difference between a t test and an F test? |
| | Interpretation Category | What concept or claims can be inferred from a static or active pattern of data? | What is happening in this graph? |
| | Casual Antecedent Category | What state or event casually led to an event or state? | How did this experiment fail? |
| | Casual Consequence Category | What are the consequences of an event or state? | What happens when this level decreases? |
| | Goal Orientation Category | What are the motives or goals behind the agent's action? | Why did you put decision latency on the y-axis? |
| | Instrumental/ Procedural Category | What instrument or plan allows an agent to accomplish a goal? | How do you present stimulus on each trial? |
| | Enablement Category | What object or resource allow an agent to perform an action? | What device allows you to measure stress? |
| | Expectational Category | Why did some expected event not occur? | Why isn't there an interaction? |
| | Judgmental Category | What value does answerer place on an idea or advice? | What do you think of this operational definition? |

Further, in an embodiment, in order to classify each of the one or more extracted questions into the one or more categories, the question categorizing processor 204B may utilize one or more classifiers that are trained on historical data, i.e., historical questions, with known categories and responses, by use of one or more rules. The one or more rules may be determined based on at least the illustrative examples shown in Table 1.

Further, in an embodiment, each of the one or more categories may be associated with at least one of the one or more similarity measures. The one or more similarity measures may correspond to one or more of a lexical similarity measure, a syntactic similarity measure, a semantic similarity measure, and a vector space similarity measure.

In an embodiment, the lexical similarity measure may be associated with the disjunctive category, the concept completion category, the feature specification category, and the casual antecedent category. In an embodiment, the syntactic similarity measure may be associated with the verification category, the quantification category, the definition category, the example category, the comparison category, the instrumental/procedural category, and the enablement category. In an embodiment, the semantic similarity measure may be associated with the definition category, the comparison category, the interpretation category, the casual antecedent category, the casual consequence category, the goal orientation category, the enablement category, the expectational category, and the judgmental category. In an embodiment, the vector space similarity measure is associated with the disjunctive category and the feature specification category.

At step 310, the second response pertaining to each of the one or more extracted questions are extracted from the one or more second electronic documents. In an embodiment, the document processor 204 may be configured to extract the second response pertaining to each of the one or more extracted questions from the one or more second electronic documents.

Prior to the extraction of the second response from the one or more second electronic documents, the document processor 204 may transmit one or more queries to the storage device, such as, the database server 106 or the memory 206, to retrieve the one or more second electronic documents. After retrieving the one or more second electronic documents, in an embodiment, the metadata extracting processor 204C may be operable to extract the metadata of the one or more second users, such as, the second user, from the one or more second electronic documents. The metadata includes one or more of a name, a grade, a roll number, a class, and a section of the second user. Further, in an embodiment, the response extracting processor 204D may be configured to extract the second response corresponding to each of the one or more questions in the one or more second electronic documents. The response extracting processor 204D may utilize the one or more natural processing techniques known in the art to extract the second response corresponding to each of the one or more questions from the one or more second electronic documents. After extracting the metadata and the first response corresponding to each of the one or more questions in the one or more first electronic documents, the document processor 204 may store the metadata and the first response corresponding to each of the one or more questions in form of a data structure in the memory 206 or the database server 106.

At step 312, the score of the second response pertaining to an extracted question, from the one or more extracted questions, is determined. The determined score may correspond to a degree of similarity of the second response with respect to the first response. In an embodiment, the score generating processor 204E may be configured to determine the score of the second response pertaining to the extracted question from the one or more extracted questions. In an embodiment, the score generating processor 204E may determine the score of the second response pertaining to the extracted question based on the one or more similarity measures that may be associated with the category of the extracted question. In an embodiment, the score generating processor 204E may utilize an appropriate similarity measure technique to determine the score of the second response with respect to the first response pertaining to the extracted question based on at least the category of the extracted question. In an embodiment, the score generating processor 204E may utilize a pre-defined mapping of the one or more similarity measures with the one or more categories to identify the appropriate similarity measure technique that may further be utilized to determine the score pertaining to the second response.

For example, the lexical similarity measure may be utilized to determine the score of the second response with respect to the first response, pertaining to each extracted question, when each extracted question corresponds to at least one of the disjunctive category, the concept completion category, the feature specification category, and the casual antecedent category. The lexical similarity measure may correspond to a measure of a degree to which one or more words/lexemes in the first response and the second response are similar.

In another exemplary scenario, the syntactic similarity measure may be utilized to determine the score of the second response with respect to the first response, pertaining to each extracted question, when each extracted question corresponds to at least one of the verification category, the quantification category, the definition category, the example category, the comparison category, the instrumental/procedural category, and the enablement category. The syntactic similarity measure may correspond to a measure of a degree to which one or more sentences of the first response and the second response are similar.

In another exemplary scenario, the semantic similarity measure may be utilized to determine the score of the second response with respect to the first response, pertaining to each extracted question, when each extracted question corresponds to at least one of the definition category, the comparison category, the interpretation category, the casual antecedent category, the casual consequence category, the goal orientation category, the enablement category, the expectational category, and the judgmental category. The semantic similarity measure may correspond to a measure of a degree to which words of the first response and the second response have similar meaning.

In an embodiment, the vector space similarity measure may be utilized to determine the score of the second response with respect to the first response, pertaining to each extracted question, when each extracted question corresponds to at least one of the disjunctive category and the feature specification category. The vector space similarity measure may correspond to a cosine similarity measure of a degree to which the first response and the second response are similar.

Table 2 depicts an illustrative mapping between one or more similarity measures and one or more categories associated with one or more questions.

TABLE 2

Illustration of one or more similarity measures associated with one or more categories

| Question category | Similarity Measure | Comment |
| --- | --- | --- |
| Verification | Syntactic | |
| Disjunctive | Lexical; Vector Space | |
| Concept Completion | Lexical | One, multiple or all match? choice of measure would depend on that |
| Feature Specification | Lexical; Vector Space | |
| Quantification | Syntactic (exact match) | |
| Definition | Syntactic; Semantic | |
| Example | Syntactic | Difficult; if finite possibilities (an example of Java wrapper class) or mostly common possibilities |
| Comparison | Syntactic; Semantic | |
| Interpretation | Semantic | the question is not too open ended (interpret a graph vs interpret the implications of changes in HRD ministry) |
| Causal Antecedent | Semantic; Lexical | certain words are more likely to be more important than the rest |
| Causal Consequence | Semantic | certain words are more likely to be more important than the rest |
| Goal Orientation | Semantic | Difficult {in particular if the question is about hidden/latent motives |
| Instrumental/ Procedural | Syntactic | Steps and sequence are important |
| Enablement | Syntactic; Semantic | Depends on how specific the question is (what do I need to measure temperature vs what do I need to succeed in life) |
| Expectational | Semantic | |
| Judgmental | Semantic | Difficult; no correct answer flow, theme, coherency needs to be captured |

In an embodiment, the determined score corresponds to the degree of similarity of the second response with respect to the first response pertaining to each question that corresponds to the one or more questions. The determined score may be normalized to [0, 1]. The score "0" corresponds to a minimum score assigned to each of the one or more extracted questions and the score "1" corresponds to a maximum score assigned to each of the one or more extracted questions. For example, a score for a second response pertaining to a first extracted question is determined to be as "1" by use of the syntactic similarity measure and the semantic similarity measure, as the first extracted question is associated with the definition category. The score "1" of the second response indicates that the second response completely matches with the first response pertaining to the first extracted question. In another illustrative example, a score for a second response pertaining to a second extracted question is determined to be as "0" by use of the syntactic similarity measure, as the second extracted question is associated with the verification category. The score "0" of the second response indicates that the second response fails to match with the first response pertaining to the second extracted question. In certain scenarios, the second response may partially match with the first response. In such a case, based on the degree of similarity, the determined score of the second response may fall between [0, 1].

At step 314, the feedback for the second response is generated based on the score determined for the second response and/or the degree of similarity of the second response with the first response. In an embodiment, the feedback generating processor 204F may be configured to generate the feedback for the second response pertaining to each of the one or more questions in the one or more second electronic documents associated with the second user. In an embodiment, the feedback generating processor 204F may generate the feedback for the second response based on the determined score for the second response and/or the degree of similarity of the first response with the second response, or vice-versa.

In an embodiment, the feedback generating processor 204F may be operable to select from one or more pre-defined feedbacks in order to generate the feedback for each second response. The selection from the one or more pre-defined feedback may be based on the determined score for the second response and/or the degree of similarity of the first response with the second response, or vice-versa.

For example, Table 3 depicts an illustrative scenario of various feedbacks based on a score determined for a second response pertaining to a question.

TABLE 3

Illustration of one or more feedback based on determined score

| Score | Feedback |
|---|---|
| >0.9 | Excellent |
| 0.7-0.9 | Very Good |
| 0.5-0.7 | Good |
| 0.35-0.5 | Average |
| <0.35 | Poor |

After determining the score and the feedback pertaining to each of the second responses in the one or more second electronic documents, the processor 202 may be configured to generate the evaluation report. The evaluation report comprises the response evaluation, i.e., the determined score and the generated feedback pertaining to each second response in the one or more second electronic documents. The evaluation report may further comprise an aggregated score and a corresponding feedback based on at least the determined score feedback pertaining to each second response in the one or more second electronic documents. Thereafter, the processor 202 may store the generated evaluation report in the storage device, such as, the memory 206 or the database server 106, based on at least the metadata of the second user.

In case of more than one second user, the processor 202 may generate the evaluation report for each of the one or more second users. In such cases, the processor 202 may further generate a summarized evaluation report. The summarized evaluation report may comprise a tabular dataset comprising the metadata (i.e., employee name, employee identification number) the aggregated score, and the corresponding feedback based on the aggregated score for each of the one or more second users. In an embodiment, the processor 202 may generate a score table that includes the metadata, the determined score, and the generated feedback.

At step 316, the generated evaluation report is rendered on a user interface displayed on the display screen of the first user-computing device 102 and/or the second user-computing device 104. In an embodiment, the processor 202 may be configured to render the generated evaluation report on the user interface displayed on the display screen of the first user-computing device 102 and/or the second user-computing device 104. The generated evaluation report comprises the response evaluation, i.e., the determined score and the generated feedback pertaining to each second response in the one or more second electronic documents associated with the second user. In an embodiment, the processor 202 may further be configured to render the generated summarized evaluation report on the user interface displayed on the display screen of the first user-computing device 102 and/or the one or more second user-computing devices, such as, the second user-computing device 104.

In an embodiment, after receiving the generated evaluation report of the one or more second users and/or the summarized evaluation report, the first user may utilize the first user-computing device 102 to review the one or more second electronic documents of the one or more second users. In an embodiment, the first user may review the one or more second electronic documents of the one or more second users, when the determined scores pertaining to one or more second responses and/or the aggregated score pertaining to the one or more second users is less than a threshold value. The threshold value may correspond to a pre-defined value that may lie in the range [0,1]. For example, the threshold value may correspond to "0.5." In such a case, the first user may utilize the first user-computing device 102 to review the one or more second electronic documents of a second user, when one or more determined scores and/or the aggregated score of the second user is less than "0.5." In case of any change in the one or more determined scores and/or the aggregated score, and the corresponding feedbacks, the first user may utilize the first user-computing device 102 to transmit the updated scores and the updated feedback to the processor 202. After receiving the updated scores and the updated feedback, the processor 202 may be configured to update the summarized evaluation report and/or the corresponding evaluation report of the second user.

In certain scenarios, the second user may not be satisfied with his/her evaluation performed by the processor 202. In such a scenario, the second user may utilize the second user-computing device 104 to rebut the evaluation (i.e., the determined score and/or the aggregated score) by the processor 202. In such a case, the first user may utilize the first user-computing device 102 to review the one or more second electronic documents of the second user, who may have rebutted the evaluation. In case of any change in the one or more determined scores and/or the aggregated score, and the corresponding feedback, the first user may utilize the first user-computing device 102 to transmit the updated scores and the updated feedback to the processor 202. After receiving the updated scores and the updated feedback, the processor 202 may be configured to update the summarized evaluation report and/or the corresponding evaluation report of the second user.

FIGS. 4A and 4B illustrate exemplary response documents, in accordance with at least one embodiment. FIG. 4A illustrates a response document submitted by a second user and FIG. 4B illustrates a digitized response document, in accordance with an embodiment of the disclosure. FIGS. 4A and 4B have been described in conjunction with FIG. 1, FIG. 2, and FIG. 3.

With reference to FIG. 4A, there is shown a response document 400A submitted by the second user. In an embodiment, the response document 400A may correspond to a scanned copy of a second handwritten document submitted by the second user, such as, a student. Prior to the submission of the response document 400A, the second user may have received the second handwritten document, such as, a question paper, from the first user, such as, an instructor or an invigilator, during an assessment test. The second handwritten document may include one or more questions. The second handwritten document may further include a blank space for attempting each of the one or more questions. Further, the first user may instruct the second user to document the metadata, such as, a user name, a user identifier, and/or the like, in the second handwritten document. The first user may further instruct the second user to document a second response pertaining to one or more of the one or more questions in the corresponding blank spaces provided in the second handwritten document. After the second user has documented the second response pertaining to the one or more questions in the second handwritten document, the second user may provide the second handwritten document, comprising the metadata, the one or more questions and the corresponding second responses, to the first user. Thereafter, the first user may utilize an image scanning device, such as, a multi-function device, for scanning the second handwritten document so as to generate a scanned second handwritten document, such, as the response document 400A. Thereafter, the first user may utilize the first user-computing device 102 to transmit the response document 400A to the database server 106 or the application server 108, over the communication network 110.

In another embodiment, after the second user has documented the second response pertaining to the one or more questions in the second handwritten document, the second user may utilize an image scanning device, such as, the multi-function device, for scanning the second handwritten document so as to generate the scanned second handwritten document, such as, the response document 400A. Thereafter, the second user may utilize a computing device, such as, the second user-computing device 104, to transmit the response document 400A to the database server 106 or the application server 108, over the communication network 110.

With reference to FIG. 4A, there is shown a digitized response document 400B, in accordance with at least one embodiment of the disclosure. After receiving the response document 400A from the first user-computing device 102 or the second user-computing device 104 over the communication network 110, the transceiver 210 may store the response document 400A in the memory 206. Thereafter, the processor 202 may retrieve the response document 400A from the memory to generate the digitized response document 400B. The digitized response document 400B may comprise content from the response document 400A in a pre-defined format. Thereafter, the document processor 204 may process the digitized response document 400B to evaluate the second responses pertaining to the one or more questions. Based on the evaluation, the processor 202 may generate the evaluation report. Thereafter, the processor 202 may transmit the evaluation report to the first user-computing device 102 and/or the second user-computing device 104 over the communication network 110.

The disclosed embodiments encompass numerous advantages. Various embodiments of the disclosure lead to a method and a system for response evaluation. Through various embodiments of the disclosure, the disclosed method and the system automatically perform an assessment of free-text answers for different types of questions across domains. The disclosed system takes as input a model set of answers (i.e., a set of first responses) and a set of actual answers (i.e., a set of second responses) and then performs existing similarity based approaches to score the answers with respect to the model answers. In this regard, a taxonomy of question categories is used in the system. A taxonomy of similarity measures is created followed by a mapping of individual similarity categories to different question categories is established (e.g., lexical similarity for definition questions, syntactic similarity for example questions, semantic similarity for interpretation questions, etc.). Once the mapping is established, a rule based engine is employed to use the proper similarity based assessment of the answers with respect to the model answer.

The disclosed method and system, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, and the like. The storage device may also be a means for loading computer programs or other instructions into the computer system. The computer system also includes a communication unit. The communication unit allows the computer to connect to other databases and the Internet through an input/output (I/O) interface, allowing the transfer as well as reception of data from other sources. The communication unit may include a modem, an Ethernet card, or other similar devices, which enable the computer system to connect to databases and networks, such as, LAN, MAN, WAN, and the Internet. The computer system facilitates input from a user through input devices accessible to the system through an I/O interface.

To process input data, the computer system executes a set of instructions that are stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as, steps that constitute the method of the disclosure. The systems and methods described may also be implemented using only software programming or using only hardware or by a varying combination of the two techniques. The disclosure is independent of the programming language and the operating system used in the computers. The instructions for the disclosure may be written in all programming languages including, but not limited to, 'C', 'C++', 'Visual C++' and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, the results of previous processing, or from a request made by another processing machine. The disclosure may also be implemented in various operating systems and platforms including, but not limited to, 'Unix', 'DOS', 'Android', 'Symbian', and 'Linux'.

The programmable instructions may be stored and transmitted on a computer-readable medium. The disclosure may also be embodied in a computer program product comprising a computer-readable medium, or with any product capable of implementing the above method and system, or the numerous possible variations thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

Various embodiments of the method and system for response evaluation. However, it should be apparent to those skilled in the art that modifications in addition to those described, are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced A person having ordinary skill in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, or the like.

The claims may encompass embodiments for hardware, software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method of operating a computer-assisted assessment system, the method comprising:
   extracting, by a document processor, one or more examination questions and a first free-text response pertaining to each of the one or more examination questions from one or more first electronic documents received from an evaluator computing device associated with an evaluator over a communication network;
   extracting, by the document processor, a second free-text response pertaining to each of the one or more extracted examination questions and metadata from one or more second electronic documents received from a subject computing device associated with a subject to be evaluated over the communication network, wherein the metadata comprises at least one subject identifier;
   for the second free-text response pertaining to each of the one or more extracted examination questions:
   determining, by a processor, a score and feedback based on one or more similarity measures associated with a category of each of the one or more extracted examination questions, wherein the one or more similarity measures comprise a lexical similarity measure, a syntactic similarity measure, a semantic similarity measure, or a vector space similarity measure, or a combination thereof, wherein:
      the lexical similarity measure is associated with a disjunctive category, a concept completion category, a feature specification category, or a casual antecedent category, or a combination thereof;
      the syntactic similarity measure is associated with a verification category, a quantification category, a definition category, an example category, a comparison category, an instrumental/procedural category, or an enablement category;
      the semantic similarity measure is associated with the definition category, the comparison category, an interpretation category, a causal antecedent category, a casual consequence category, a goal orientation category, the enablement category, an expectational category, or a judgmental category, or a combination thereof; and
      the vector space similarity measure is associated with a disjunctive category, the feature specification category, or both;
   generating, by the processor, an evaluation report comprising the determined score and the feedback; and
   rendering, by the processor, the evaluation report on a user interface displayed on a display screen of the evaluator computing device.

2. The method of claim 1 wherein the subject identifier comprises one or more of a name, a grade, a roll number, a class, and a section.

3. The method of claim 1 further comprising classifying, by the document processor, each of the one or more extracted examination questions in the one or more categories based on at least a type and content of the one or more extracted examination questions.

4. The method of claim 3, wherein the one or more categories correspond to one or more of the verification category, the disjunctive category, the concept completion category, the feature specification category, the quantification category, the definition category, the example category, the comparison category, the interpretation category, the casual antecedent category, the casual consequence category, the goal orientation category, the instrumental/procedural category, the enablement category, the expectational category, and the judgmental category.

5. The method of claim 1, wherein the lexical similarity measure is associated with the disjunctive category, the concept completion category, the feature specification category, and the casual antecedent category.

6. The method of claim 1, wherein the syntactic similarity measure is associated with the verification category, the quantification category, the definition category, the example category, the comparison category, the instrumental/procedural category, and the enablement category.

7. The method of claim 1, wherein the semantic similarity measure is associated with the definition category, the comparison category, the interpretation category, the casual antecedent category, the casual consequence category, the goal orientation category, the enablement category, the expectational category, and the judgmental category.

8. The method of claim 1, wherein the vector space similarity measure is associated with the disjunctive category and the feature specification category.

9. The method of claim 1 further comprising receiving, by the processor, an updated score and an updated feedback, pertaining to the second free-text response, from the evaluator, when the determined score is less than a threshold score.

10. The method of claim 1 further comprising receiving, by the processor, an updated score and an updated feedback, pertaining to the second free-text response, from the evaluator, when the determined score is rebutted by the subject.

11. The method of claim 1, wherein the evaluator is a teacher and the subject is a student.

12. The method of claim 1, wherein the one or more similarity measures comprise the lexical similarity measure, the syntactic similarity measure, the semantic similarity measure, and the vector space similarity measure.

13. A computer-assisted assessment system, the system comprising:
a document processor configured to:
extract one or more examination questions and a first free-text response pertaining to each of the one or more examination questions from one or more first electronic documents received from an evaluator computing device associated with an evaluator over a communication network;
extract a second free-text response pertaining to each of the one or more extracted examination questions and metadata from one or more second electronic documents received from a subject computing device associated with a subject to be evaluated over the communication network, wherein the metadata comprises at least one subject identifier;
a processor configured to:
for the second free-text response pertaining to each of the one or more extracted examination questions:
determine a score and feedback based on one or more similarity measures associated with a category of each of the one or more extracted examination questions, wherein the one or more similarity measures comprise a lexical similarity measure, a syntactic similarity measure, a semantic similarity measure, or a vector space similarity measure, or a combination thereof, wherein:
the lexical similarity measure is associated with a disjunctive category, a concept completion category, a feature specification category, or a casual antecedent category, or a combination thereof;
the syntactic similarity measure is associated with a verification category, a quantification category, a definition category, an example category, a comparison category, an instrumental/procedural category, or an enablement category;
the semantic similarity measure is associated with the definition category, the comparison category, an interpretation category, a causal antecedent category, a casual consequence category, a goal orientation category, the enablement category, an expectational category, or a judgmental category, or a combination thereof; and
the vector space similarity measure is associated with a disjunctive category, the feature specification category, or both;
generate, by the processor, an evaluation report comprising the determined score and the feedback; and
render the evaluation report on a user interface displayed on a display screen of the evaluator computing device.

14. The system of claim 13, wherein the document processor is further configured to classify each of the one or more extracted examination questions in one or more categories based on at least a type and content of the one or more extracted examination questions.

15. The system of claim 14, wherein each of the one or more categories is associated with at least one of the one or more similarity measures, wherein the one or more similarity measures correspond to one or more of the lexical similarity measure, the syntactic similarity measure, the semantic similarity measure, and the vector space similarity measure.

16. The system of claim 13, wherein the processor is further configured to receive an updated score and an updated feedback, pertaining to the second free-text response, from a first the evaluator, when the determined score is less than a threshold score.

17. The system of claim 13, wherein the processor is further configured to receive an updated score and an updated feedback, pertaining to the second free-text response, from the evaluator, when the determined score is rebutted by the subject.

18. The system of claim 13, wherein the evaluator is a teacher and the subject is a student.

19. The system of claim 13, wherein the one or more similarity measures comprise the lexical similarity measure, the syntactic similarity measure, the semantic similarity measure, and the vector space similarity measure.

20. A computer program product for use with a computer-assisted assessment system, the computer program product comprising a non-transitory computer readable medium, wherein the non-transitory computer readable medium stores a computer program code for operating the computer-assisted assessment system, wherein the computer program code is executable by a processor in a server to:
extract one or more examination questions and a first free-text response pertaining to each of the one or more examination questions from one or more first electronic documents from an evaluator computing device associated with an evaluator over a communication network;
extract a second free-text response pertaining to each of the one or more extracted examination questions and metadata from one or more second electronic documents from a subject computing device associated with a subject to be evaluated over the communication network, wherein the metadata comprises at least one subject identifier;
for the second free-text response pertaining to each of the one or more extracted examination questions:
determine a score and feedback based on one or more similarity measures associated with a category of each of the one or more extracted examination questions, wherein the one or more similarity measures comprise a lexical similarity measure, a syntactic similarity measure, a semantic similarity measure, or a vector space similarity measure, or a combination thereof, wherein:
the lexical similarity measure is associated with a disjunctive category, a concept completion category, a feature specification category, or a casual antecedent category, or a combination thereof;
the syntactic similarity measure is associated with a verification category, a quantification category, a definition category, an example category, a comparison category, an instrumental/procedural category, or an enablement category;

the semantic similarity measure is associated with the definition category, the comparison category, an interpretation category, a causal antecedent category, a casual consequence category, a goal orientation category, the enablement category, an expectational category, or a judgmental category, or a combination thereof; and the vector space similarity measure is associated with a disjunctive category, the feature specification category, or both;

generate, by the processor, an evaluation report comprising the determined score and the feedback; and render the evaluation report on a user interface displayed on a display screen of the evaluator computing device.

21. The computer program product of claim 20, wherein the evaluator is a teacher and the subject is a student.

* * * * *